United States Patent [19]

Tsukada et al.

[11] Patent Number: 4,640,987
[45] Date of Patent: Feb. 3, 1987

[54] CORDLESS TELEPHONE

[76] Inventors: Keizo Tsukada, Tokyo; Masato Yamagata, both of c/o Sony Corporation, 7-35 Kitashinagawa 6-chome, Shinagawa-ku, Tokyo, Japan

[21] Appl. No.: 725,341

[22] Filed: Apr. 19, 1985

[30] Foreign Application Priority Data

Apr. 23, 1984 [JP] Japan .................. 59-81438
May 8, 1984 [JP] Japan .................. 59-91545

[51] Int. Cl.⁴ .............................. H04Q 7/04
[52] U.S. Cl. ........................ 379/62; 379/61; 379/159
[58] Field of Search ........... 179/2 E, 2 EA, 2 EB, 179/2 EC, 18 DA, 18 BF

[56] References Cited

U.S. PATENT DOCUMENTS

| 4,392,243 | 7/1983 | Ohhashi et al. | 458/74 |
| 4,468,539 | 8/1984 | Schober | 179/2 EA |
| 4,468,540 | 8/1984 | Cripps | 179/2 EA |
| 4,469,918 | 9/1984 | Cripps | 179/2 EA |
| 4,471,166 | 9/1984 | Cripps | 179/2 EA |

FOREIGN PATENT DOCUMENTS 2918494 11/1980 Fed. Rep. of Germany ... 179/2 EA

Primary Examiner—Robert G. Lev
Attorney, Agent, or Firm—Lewis H. Eslinger; Alvin Sinderbrand

[57] ABSTRACT

A cordless telephone has a transfer capability by which an incoming telephone call may be transferred from the base unit to the handset unit or from the handset unit to the base unit. Each unit includes an intercom key which may be actuated to place the telephone in an intercom mode wherein the base unit and the handset unit are in communication with each other while the incoming call is on hold. Deactuation of one unit in the intercom mode results in the other unit being automatically adapted to receive the incoming call. Alternatively, actuation of either intercom during the intercom mode results in both units being automatically adapted to receive the incoming call and placed in communication with each other.

12 Claims, 7 Drawing Figures

CORDLESS TELEPHONE

RELATED APPLICATIONS

U.S. patent application Ser. No. 06/696,183, filed Jan. 29, 1985 in the name of persons having an obligation of assignment to the assignee of the present invention and commonly assigned herewith, and U.S. patent application Ser. No. 722,359, filed 4/12/85, in the name of persons having an obligation of assignment to the assignee of the present invention and commonly assigned herewith.

FIELD OF THE INVENTION

The present invention relates generally to cordless telephones, and in particular relates to a cordless telephone having a transfer capability between units.

BACKGROUND OF THE INVENTION

The standard telephone consists of a base unit and a handset unit connected to each other by an electrical cord. The base unit itself is connected by another cord to a receptacle on a wall, telephone pole or a similar immovable structure to which the telephone network line extends. Therefore, the range of movement of the operator of the telephone is quite limited. Even when the cords connecting the handset unit to the base unit and the base unit to the wall are long, it can be cumbersome to move either the entire telephone around to make calls from different locations or to walk around with the handset unit once a call has been placed. The simple fact that there is always a continuous physical connection between the person making the phone call and the immovable wall or other fixed structure can be a great inconvenience.

The cordless telephone represents a significant improvement over the standard telephone. In the conventional cordless telephone, the base unit is still connected to the receptacle on the immovable wall or the like by a cord so that message signals from the telephone network line may be received and transmitted. However, the handset unit of the cordless telephone is an independently operative unit from which calls may be made and by which calls may be received with no physical connection to the base unit. Instead, the base unit and the handset unit of the cordless telephone communicate with each other over a communication channel established by the transmission and reception of electromagnetic waves, conventionally radio waves. The handset unit may then be taken to distances of up to 300 meters from the base unit, while still making and receiving telephone calls.

The handset unit has a transmitting/receiving system or transceiver and a loudspeaker in the earpiece and a microphone in the mouthpiece. In some cordless telephones, the base unit also has either loudspeaker and microphone incorporated within the base unit itself, or in an auxiliary standard telephone connectable to both the base unit and the outside telephone network line. When the base unit receives an incoming call, the base loudspeaker/microphone can be used to converse directly with the caller. Frequently such a cordless telephone has a transfer capability wherein the incoming call is transferred from the base unit to the handset unit to establish communication between the handset loudspeaker/microphone and the telephone network line through the base unit, with the base loudspeaker/microphone or auxiliary telephone being no longer in communication with the telephone network line. By this means, an operator at the base unit can receive an incoming call and can transfer it to a second operator using the handset unit. This is an additional feature making the cordless telephone even more convenient.

However, previously proposed cordless telephones having this transfer capability have required a number of extra switches, so that the proper operation thereof can be quite complicated. In one such cordless telephone, when an incoming call is received, the operator at the base unit depresses a hold key on the base unit to hold the outside line, and then moves a mode switch to establish an intercom mode wherein the base loudspeaker/microphone is in communication with the handset loudspeaker/microphone. Then the base operator depresses a call key on the base unit to send a signal to the handset unit to cause it to ring. If the handset operator answers by depressing a key on the handset unit, the base operator returns the mode switch from the intercom position and the hold key is again depressed to release the incoming call, whereby the handset loudspeaker/microphone receives the incoming call. On the other hand, if the operator at the handset unit does not answer, the mode switch and hold key are actuated in turn so that the loudspeaker/microphone of the base unit again communicate with the incoming call.

This cordless telephone requires at minimum a hold key, a mode switch, and a call key on the base unit. The higher the number of additional switches and keys, the greater is the consequent complexity and manufacturing cost of the cordless telephone. Furthermore, these switches and keys must be exposed for easy access on the surface of the unit and thus there is a possibility that they may be operated at the wrong time, in the wrong order, or even inadvertently, with the result that the incoming call may not be transferred to the handset unit, or in the worst case the incoming call will be cut off.

Furthermore, there is no provision for transferring the call back from the handset unit to the base unit, which would be a highly advantageous feature adding considerably to the convenience of the cordless telephone.

Additionally, the previously proposed cordless telephones with transfer capability have not had the capacity to establish three way communication between the handset loudspeaker/microphone, the base loudspeaker/microphone, and the telephone network line.

OBJECTS AND SUMMARY OF THE INVENTION

Accordingly, it is an object of the present invention to provide an improved cordless telephone which eliminates the difficulties of the prior art.

It is another object of the present invention to provide a cordless telephone with a transfer capability by which an incoming telephone call may be transferred from the base unit to the handset unit and from the handset unit to the base unit.

It is another object of the present invention to provide a cordless telephone with the aforesaid transfer capability which may be operated easily and conveniently.

It is still another object of the present invention to provide a cordless telephone with the aforesaid transfer capability having a minimum number of actuable switches for performing this function.

It is yet another object to the present invention to provide a cordless telephone having the aforesaid transfer capability wherein three-way communication is possible between the handset unit, the base unit, and the telephone network line.

In accordance with an aspect with of the present invention, there is provided a cordless telephone comprising a base unit connectable to a telephone network line for receiving and transmitting signals therethrough, and a handset unit selectively mountable upon and separable from the base unit. The base and handset units have respective transceiver means for the transmission and reception of signals therebetween over electromagnetic waves, the handset unit including handset loudspeaker/microphone means and the base unit having base loudspeaker/microphone means associated therewith. Connection means are provided for selectively connecting the base and handset loudspeaker/microphone means with the telephone network line and each other and include hold means for reserving and releasing a telephone call appearing on the telephone network line. First intercom key means is actuable at the base unit, and first enabling means is actuable at the base unit for enabling communication of the base loudspeaker/microphone means with the handset loudspeaker/microphone means and the telephone network line. The handset unit has second actuable intercom key means and second actuable enabling means for enabling communication of the handset loudspeaker/microphone with the base loudspeaker/microphone and the telephone network line. Mode control means are operative for selectively establishing a plurality of modes of the telephone including a telephone mode wherein the hold means releases the telephone call and the loudspeaker/microphone means of one of the base and handset units is in communication with the telephone network line, and an intercom mode wherein the hold means reserves the telephone call and the base and handset loudspeaker/microphone means are in communication with each other. At a time when the telephone is operated in the telephone mode with one of the base and handset units in communication with the telephone network line, the mode control means is responsive to actuation of the intercom key means of that one unit to establish the intercom mode, and further, at a time when the telephone is operated in the intercom mode, mode control means is responsive to deactuation of the enabling means of one of the base and handset units to establish the telephone mode with the loudspeaker/microphone means of the other unit in communication with the telephone network line.

In a first preferred embodiment of the cordless telephone according to the present invention, the base loudspeaker/microphone means are constituted by an auxiliary standard telephone connectable through the connection means to both the telephone network line and the base unit. The enabling means in this embodiment includes the conventional switch within the standard telephone actuated when the receiver is lifted from or returned to its crade.

In a second preferred embodiment of the cordless telephone according to the present invention, the base loudspeaker/microphone means are incorporated within the base unit itself, and the enabling means includes an actuable switch and relay circuits within the base unit.

These, and other objects, features and advantages of the cordless telephone according to the present invention, will become apparent from the following detailed description of the preferred embodiments and the accompanying drawings, throughout which like reference numerals designate like elements and parts.

DESCRIPTION OF THE PREFERRED EMBODIMENTS

Figure 1:
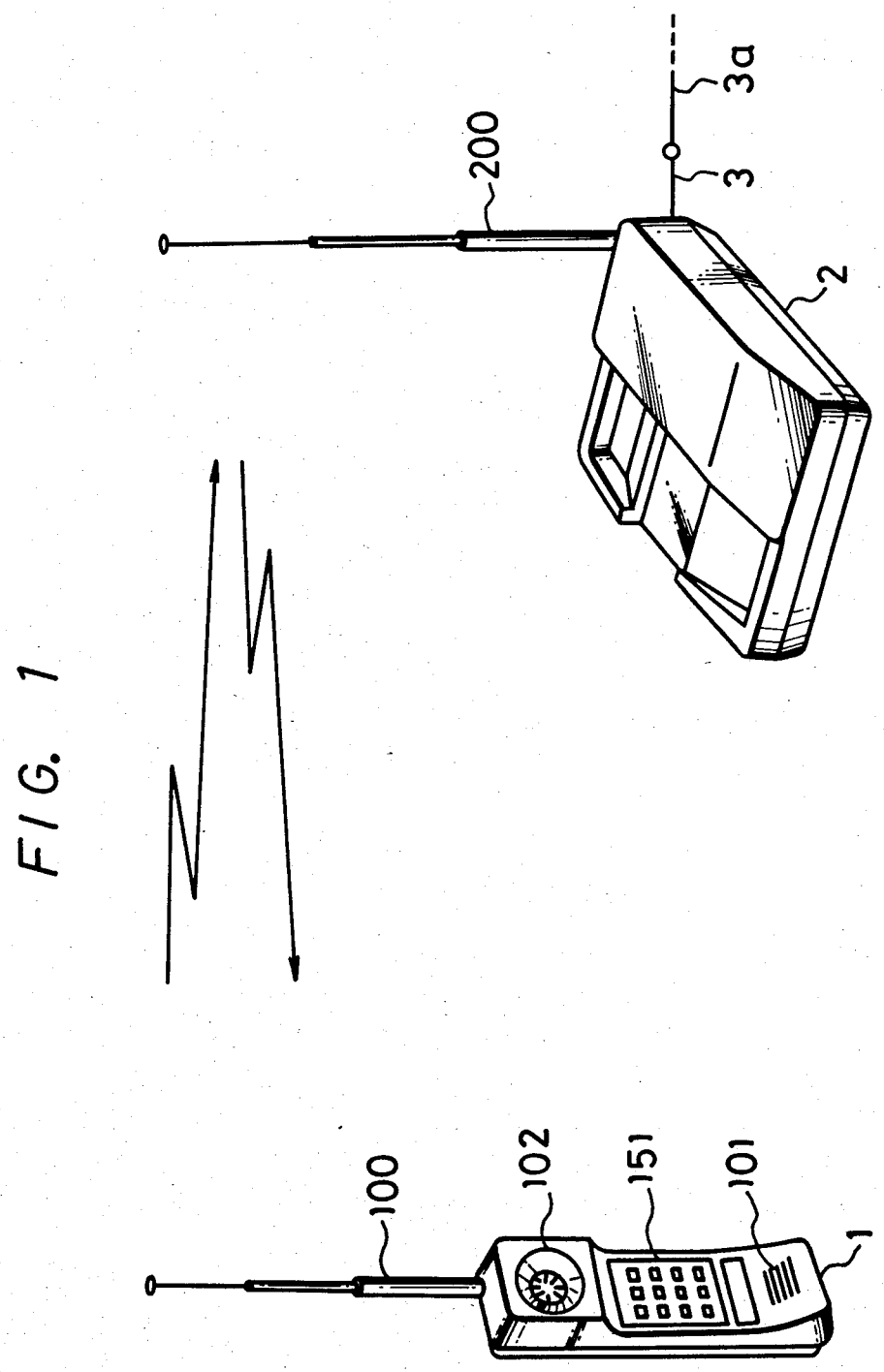
FIG. 1 is a perspective view of a cordless telephone of a type to which the present invention may be applied, and with a handset unit being shown separated from a base unit.

Referring to the drawings in detail, and initially to FIG. 1 thereof, a cordless telephone 10 of a type to which the present invention may be applied is there shown to include a handset unit 1 and a base unit 2. Base unit 2 is connected by a telephone cord 3 to an outlet or receptacle in a wall, a telephone pole, or another fixed structure, so that it may both receive and transmit telephone message signals through a telephone network line 3a and also may be powered thereby. An antenna 100 on handset unit 1 and a corresponding antenna 200 on base unit 2 are used to create a communication channel between the two units by the transmission and reception of radio waves, schematically illustrated in FIG. 1 by the arrows extending between the antennas. As is conventional, handset unit 1 includes a ten-key panel 151 for making or dialing outgoing calls, and a mouthpiece 101 and an earpiece 102 with which a microphone and a loudspeaker (not shown) are, respectively, associated. A telephone number may be entered on ten-key panel 151, and corresponding information is transmitted over the communication channel to base unit 2 and thence to telephone network line 3a. Alternatively, when base unit 2 receives a message signal from the telephone network line indicating that an incoming call is present, a signal from base unit 2 causes a bell in handset unit 1 and a buzzer in base unit 2 to ring to indicate the existence of the incoming call.

The standard maximum separation of such a handset unit 1 and base unit 2 is about 300 meters, set by the Federal Communications Commission. The frequencies of the radio waves transmitted therebetween are in the 40 MHz band, and typically there are ten duplex channels permitted for each system.

Figure 2:
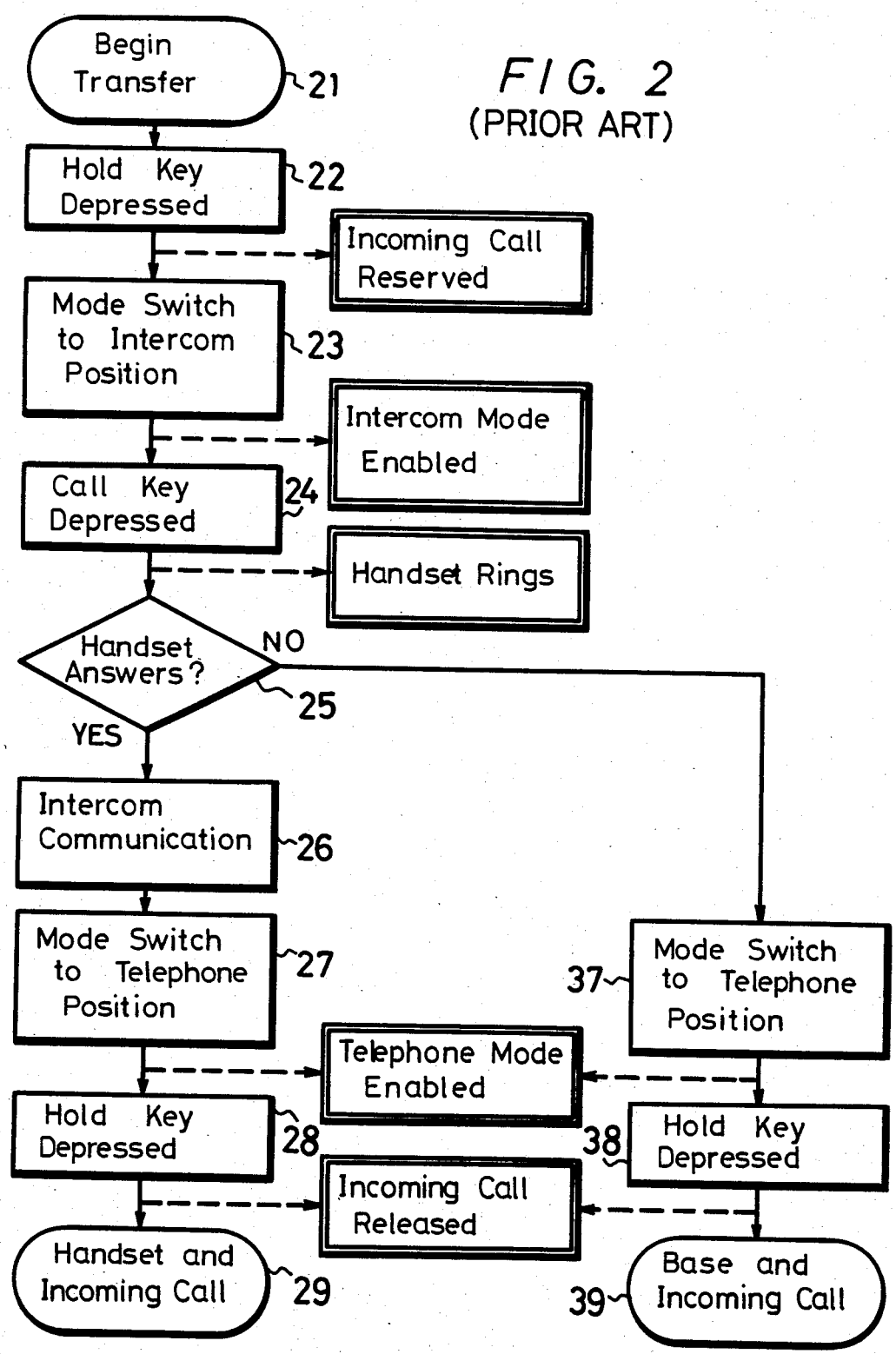
FIG. 2 s a flowchart illustrating the operation of a prior art cordless telephone.

Before describing the structure and operation of the cordless telephone according to the present invention, and in particular the advantageous transfer capability thereof, it is instructive to consider the operation of prior art cordless telephones with transfer capability. The operation of the prior art cordless telephone mentioned in the Background section is illustrated in FIG. 2 in the form of a flowchart. In this flowchart, the physical actuation of the various switches and the operational steps of the telephone are illustrated in the single bordered boxes, while the resultant conditions of the telephone are illustrated in the double bordered boxes. The transfer operation begins in step 21, during which base unit 2 of the prior art cordless telephone is in communication with telephone network line 3a. At this point, transmissions between the loudspeaker/microphone or electro-audio-transducer of base unit 2 and telephone network line 3a are permitted in a telephone mode of operation. In step 22, a hold key, which may be a push button switch provided on base unit 2, is depressed to hold the incoming telephone call. This reserves the telephone call while permitting the transfer of signals between base unit 2 and handset unit 1.

In step 23, a two position slide or mode selecting switch for changing over between the telephone mode and the intercom mode is moved to its intercom position to enable the intercom mode between the base and handset units. In step 24, a non-locking call key is depressed to cause the base unit 2 to send a control signal to handset unit 1, which is responsive to the received control signal to produce a bell sound, i.e. it rings. In step 25, base unit 2 determines whether or not handset unit 1 has answered, conventionally by retransmitting back a second control signal indicating an answer. If handset unit 1 answers, the procedure moves to step 26, wherein the intercom mode of the cordless telephone is established and the base unit operator can inform the operator at the handset unit of the incoming call. In step 27, the mode switch is slid to its telephone mode position, to recover the telephone mode of operation. In step 28, the hold key is again depressed to release the incoming call, so that, in step 29, handset unit 1 is now in communication with telephone network line 3a and the handset unit operator can talk with the caller.

On the other hand, if in step 25 handset unit 1 does not answer, the procedure moves to step 37, wherein the mode switch is slid to the telephone mode position to recover the telephone mode, and in step 38 the hold key is depressed to release the incoming telephone call. Thus in step 39, base unit 2 is once again in communication with telephone network line 3a, so that the base operator may talk with the caller.

Therefore, a hold key, a mode selecting switch and a call key are all required on base unit 2 to transfer the incoming call from base unit 2 to handset unit 1. These switches increase the manufacturing cost of the cordless telephone, and are easily accessible and thus likely to be inadvertently or incorrectly actuated. Clearly, from the illustrated flowchart, actuation of the switches in the wrong order will not produce the desired transfer from the base unit 2 to handset unit 1. The confusion of operators in attempting to transfer incoming telephone calls from the base unit to the handset unit with such a complicated system is well known and constitutes a significant disadvantage in such prior art cordless telephones. A cordless telephone 10 10 according to the present invention, on the other hand, not only provides this transfer capability from the base unit to the handset unit with only a single additional intercom mode key, as will be described below, but provides an additional transfer capability from the handset unit back to the base unit and enables communication between all three of the handset unit, the base unit, and the telephone network line.

Figure 3:
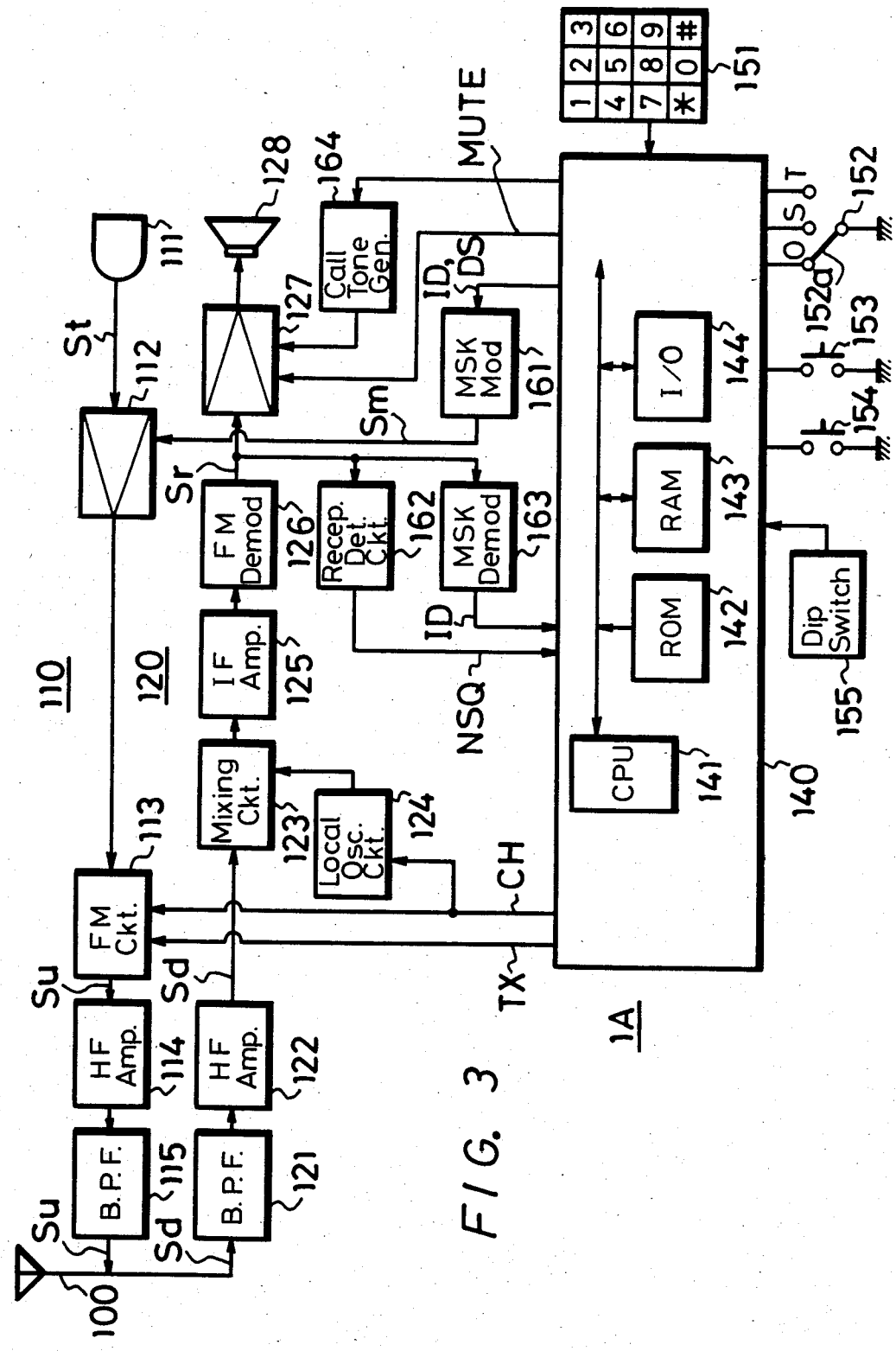
FIG. 3 is a block diagram illustrating a portion of the circuitry of a handset unit of a cordless telephone according to a first preferred embodiment of the present invention.
Figure 4:
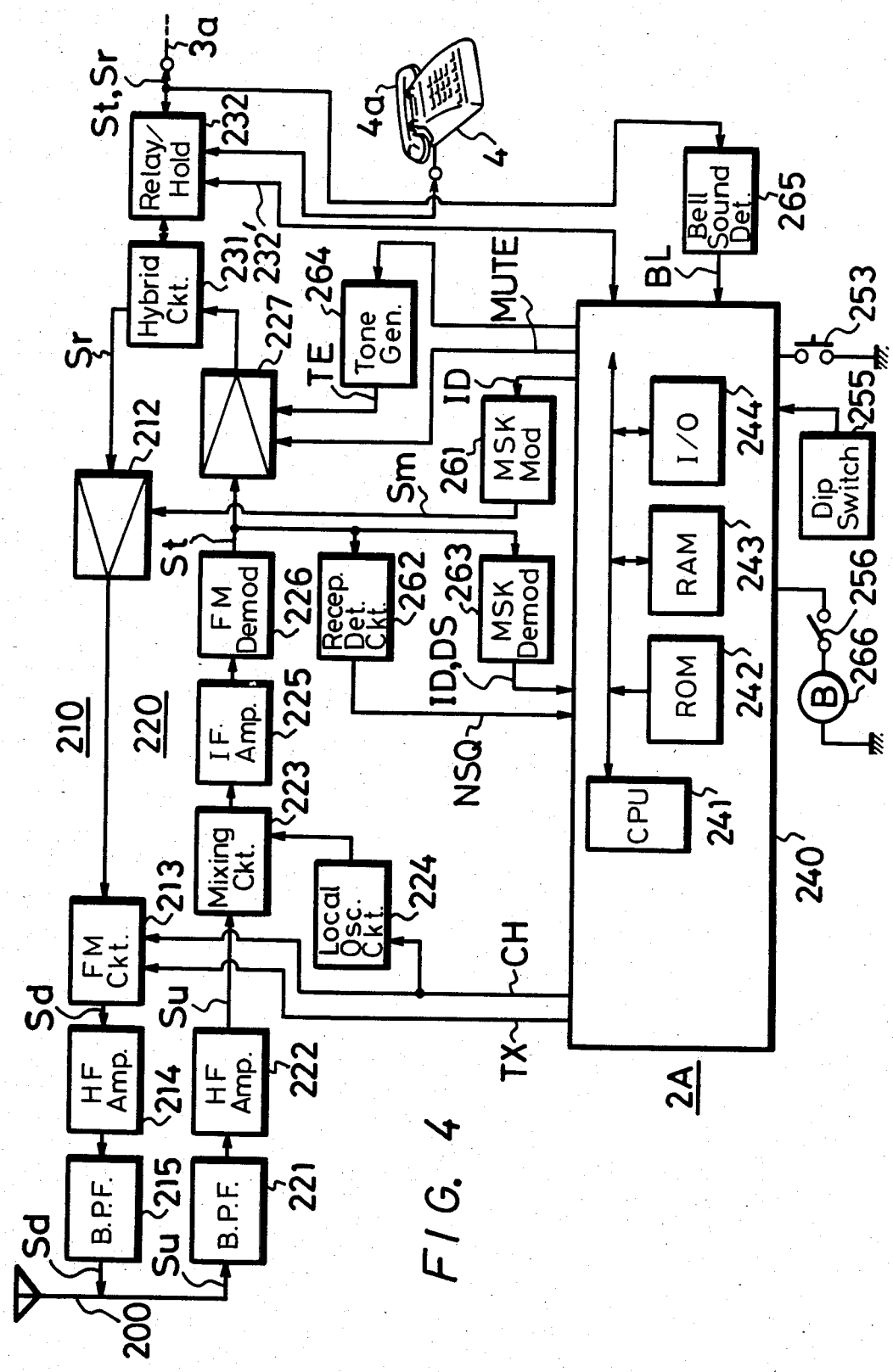
FIG. 4 is a block diagram illustrating a portion of the circuitry of a base unit included in the cordless telephone according to the first preferred embodiment.

Referring now to FIGS. 3 and 4, important portions of the circuitry contained within handset unit 1A and base unit 2A, respectively, of a cordless telephone according to the present invention are therein illustrated. It should be noted that the circuitry within these two units contains many corresponding elements, so that the two figures and their accompanying description should be considered together.

Handset unit 1A (FIG. 3) has a transmission which includes a transmission system 110 comprised of elements bearing reference numerals 111 to 115, and a receiving system 120, comprised of elements bearing reference numerals 121 to 128. Base unit 2A (Fig.4) similarly has a transceiver which includes a transmission system 210 comprised of elements bearing reference numerals 212 to 215, and a receiving system 220 comprised of elements bearing reference numerals 221 to 227. Base unit 2A further includes a connecting circuit 230, including elements 231 and 232, and serving to connect the transmission system 110, the receiving system 120 and an auxiliary telephone 4 to telephone network line 3a. In the first preferred embodiment, auxiliary telephone 4 having a receiver 4a is used as the loudspeaker/microphone or electro-audio transducer associated with base unit 2. For a better understanding of the present invention, the function and operation of these elements will be described as signals are transmitted between the two units. In the illustrated embodiment, the signals are transmitted over a selected one of two allowed duplex channels, A and B, each containing an upper channel and a lower channel.

Therefore, for the transmission of a signal from handset unit 1A (FIG. 3), an audio signal St from a microphone 111 contained within mouthpiece 101 of handset unit 1A is supplied through an audio frequency amplifier 112 to a frequency modulating circuit 113, which outputs a corresponding high frequency FM signal Su in the upper channel of a selected one of duplex channels A or B. For this purpose, frequency modulating circuit 113 is provided with a channel selecting signal CH generated in accordance with the operation of a channel selector switch 154. Channel selecting signal CH may be used to determine the frequency of a local oscillator signal used to frequency convert the FM signal to radio frequencies. Signal Su is supplied through a high frequency amplifier 114 and a band pass filter 115 with a pass band including both upper channels to antenna 100, by which it is transmitted as a radio frequency wave to base unit 2A over the communication channel.

Referring now to FIG. 4, signal Su transmitted from handset unit 1A is received at base unit 2A by antenna 200 and is supplied through a band pass filter 221 and a high frequency amplifier 222 to a mixing circuit 223. Mixing circuit 223 receives a local oscillation signal from a local oscillator circuit 224 receiving channel selecting signal CH to frequency convert the signal Su to an FM intermediate frequency signal. This FM signal is supplied through an intermediate frequency amplifier 225 to an FM demodulating circuit 226, wherein it is demodulated to produce audio signal St. Audio signal St is passed to telephone network line 3a through an audio frequency amplifier 227 and the signal transmission circuit comprising a hybrid circuit 231, and a relay circuit 232. Hybrid circuit 231 has solid state components and moving contacts to form a transition between the electronic receiving system 220 and electromechanical relay circuit 232. Relay circuit 232 includes a relay of the type to make and break the connection between base unit 2A and telephone network line 3a, and a hold relay which in a first position can hold a connection with telephone network line 3a while disconnecting it from hybrid circuit 231 and auxiliary telephone 4, so that telephone communication with telephone network line 3a is temporarily interrupted during an intercom operation while keeping the incoming call available on telephone network line 3a. This operation is referred to herein as reserving the incoming call. The hold relay has a second position in which telephone network line 3a is made available for connection to hybrid circuit 231, auxiliary telephone 4, or both. This operation is referred to as releasing the incoming call.

The transmission of signals from base unit 2A to handset unit 1A will now be described. When incoming message signals are received from telephone network line 3a, the audio signal Sr is supplied through relay circuit 232, hybrid circuit 231 and audio frequency amplifier 212 to a frequency modulating circuit 213, which outputs a corresponding high frequency FM signal Sd in the lower channel of the same duplex channel (A or B) as signal Su. Frequency modulating circuit 213 is supplied with channel selecting signal CH for this purpose. Signal Sd is supplied through a high frequency amplifier 214 and a band pass filter 215 with a pass band including the lower channels of both A and B channels to antenna 200, by which it is transmitted to handset 1A over the communication channel.

Referring back to FIG. 3, signal Sd is received by antenna 100 and is supplied through a band pass filter 121 with a pass band including both lower channels and a high frequency amplifier 122 to a mixing circuit 123. Mixing circuit 123 is supplied with a local oscillation signal from a local oscillator circuit 124 receiving channel selecting signal CH, so that signal Sd is frequency converted to an FM intermediate frequency signal. This FM signal is supplied through an intermediate frequency amplifier 125 to an FM demodulating circuit 126, wherein it is demodulated to the audio signal Sr and supplied through an audio frequency amplifier 127 to an electro-audio transducer or loudspeaker 128 contained within an earpiece of handset unit 1A.

In accordance with an important aspect of the present invention, handset unit 1A further contains a control circuit, generally designated by reference numeral 140 in FIG. 3, and base unit 2A similarly contains a control circuit, generally indicated by reference numeral 240 in FIG. 4. These control circuits may each advantageously be comprised in whole or in great part by a microprocessor or microcomputer, contained on a single integrated chip. An advantageous example is the MSM-6404 microcomputer IC manufactured by Oki Electric Industry Co., Ltd. Control circuit 140 includes a central processing unit (CPU) 141, for 4-bit parallel processing, a read only memory (ROM) 142, which stores control programs for controlling the operation of CPU 141, a random access memory (RAM) 143 serving as a work and storage area, and input/output (I/O) port 144.

Similarly in base unit 2A, control circuit 240 includes a CPU 241, a ROM 242, a RAM 243 and an I/O port 244, each performing a function corresponding to that of the element of control circuit 140 having the same two final digits in the reference numeral. A detailed description is given below of the operation and control of each of these elements, but it should be understood that a control circuit such as control circuits 140 and 240 may, under the control of an appropriate control program, be designed to perform different functions at different times and to control the operation of several elements. At each stage of operation of the control circuit by the control program, the control circuit may be viewed as a means for performing a certain function. According to an important aspect of the present invention, one of a plurality of operational modes of the cordless telephone according to this invention may be established in response to actuation of certain keys. At such time, control circuits 140, 240 may be regarded as mode control means for establishing a telephone mode, an intercom mode, etc. Similarly, in accordance with another aspect of the present invention, two identifying codes are compared for identity to establish the communication channel, and at such time control circuits 140, 240 may be regarded as identity detecting means. The discussion below will make clear at all times what functions control circuits 140 and 240 are performing and precisely how such functions are carried out.

Connected to control circuit 140 and controlled thereby are ten-key panel 151, a talk switch 152, an intercom key 153, the above-mentioned channel selector key 154, and a dip switch 155. Ten-key panel 151 has conventional non-lock push button switches for inputting the telephone number to be called. Talk switch 152 is a three position change-over switch used for selecting an operational mode of handset unit 1A. When a movable contact 152a of talk switch 152 contacts fixed contact O (the OFF position), the power is turned off to all the elements within handset unit 1A except control circuit 140, to place handset unit 1A in an off mode. When movable contact 152a contacts fixed contact S (the STANDBY position), control circuit 140 is placed in a standby mode to await the signal Sd from base unit 2A. When movable contact 152a contacts fixed contact T (the TALK position), handset unit 1A is placed in a talk mode and the communication channel between handset unit 1A and base unit 2A may be established. Within the talk mode, handset unit 1A may be placed in a telephone mode, an intercom mode, or a hybrid mode, as will be discussed below.

Channel selector key 154 is a non-lock push button switch for selecting either channel A or B for the communication channel between handset unit 1A and base unit 2A. This signal specifies the desired upper or lower channel by specifying the frequency dividing ratio of a variable frequency dividing circuit contained within local oscillator circuit 124. Dip switch 155 may be an IC with pins selectively set by the operator to enter respective binary values and is used by the operator to input a selected identifying code ID to control circuit 140.

Intercom key 153 represents an important feature of the cordless telephone according to the present invention, in that it provides an easily operated transfer capability which is very convenient for the operator. Intercom key 153 is a non-lock push button switch, and a detailed description of its function will be given below in connection with FIGS. 5, 6 and 7. The respective outputs from the push button switches forming ten-key panel 151, talk switch 152, intercom key 153, channel selector key 154 and dip switch 155 are supplied to control circuit 140 for processing.

An MSK (minimum shift key) modulating circuit 161 is connected to control circuit 140 for converting binary signals supplied thereto by control circuit 140 to an MSK signal Sm in the audio frequency band. These binary signals include identifying code ID, which will be described in greater detail later, and a dial signal DS corresponding to the telephone number entered through ten-key panel 151. Importantly, MSK signal Sm may also include a control signal for indicating to base unit 2A that intercom key 153 has been depressed and that an incoming call is to be transferred. MSK signal Sm is supplied to audio frequency amplifier 112 for transmission to base unit 2A within signal Sd in the manner described above. The output of FM demodulating circuit 126 is also supplied to a reception detecting circuit 162 for detecting the presence or absence of signal Sd in the output. As is well known, the frequency components of the output are different in the presence or absence of signal Sd. A detection signal NSQ generated by reception detecting circuit 161 when signal Sd is present is supplied to control circuit 140.

Base unit 2A contains a similar MSK modulating circuit 261 for encoding the identifying code ID, dial signal DS, channel selecting signal CH, the control signal indicating an incoming call to be transferred, and other signals in a signal Sm transmitted from base unit 2A to handset unit 1A. In handset unit 1A, an MSK demodulating circuit 163 is supplied with the output of FM demodulating circuit 126 to demodulate the identifying code ID, control signal and other signals encoded in MSK signal Sm. The demodulated signals are supplied to control circuit 140.

When an incoming call is detected in base unit 2A and signal Sd is transmitted to handset unit 1A, signal NSQ is supplied to control circuit 140 and an appropriate signal is supplied to a call tone generator 164 for generating a bell sound signal. The bell sound signal is supplied to audio amplifier 127 to generate a bell sound, i.e. handset unit 1 rings.

Control circuit 140 also generates a control signal TX supplied to frequency modulating circuit 113 to control whether or not FM signal Su is output therefrom. As described in the commonly assigned related applications cited above, the communication channel is established only when identity between identifying codes stored in base unit 2A and handset 1A is detected. When identity is detected, signal TX enables frequency modulated circuit 113 to output signal Su, whereas if identity is not detected, signal TX disables frequency modulating circuit 113.

Control circuit 140 also generates a muting signal MUTE supplied to audio frequency amplifier 127. As is conventional, muting signal MUTE is produced when no telephone conversation is in progress, to prevent extraneous noise from being generated and output through transducer 128.

Referring now to FIG. 4, control circuit 240 of base unit 2A is similar to control circuit 140 of handset unit 1A and performs many corresponding functions. Control circuit 240 provides similar means for detecting when the two identifying codes, one stored in base unit 2A and one received from handset unit 1A, are or are not identical, and for supplying control signal TX to FM modulator 213 to establish or cut off transmission of signal $S_d$, respectively. Thus, control circuit 240 includes CPU 241, ROM 242, RAM 243, and I/O port 244.

An MSK modulator 261, reception detecting circuit 262 and MSK demodulator 263 are provided which perform similar functions to the corresponding elements in handset unit 1A, and will not be further described. A call buzzer 266 is provided along with a locking push button switch 255 for turning call buzzer 266 on and off. A tone generating circuit 264 generates a tone encode signal TE corresponding to the telephone number for an outgoing call, which signal TE is supplied to audio frequency amplifier 227 and thence to hybrid circuit 231 for transmission to telephone network line 3a.

A bell sound signal detecting circuit 265 is connected to the telephone network line 3a to detect an incoming bell sound signal indicating an incoming call. The output BL of bell signal detecting circuit 265 is supplied to control circuit 240.

A signal line 232' is provided between control circuit 240 and relay circuit 232. In accordance with signals supplied from control circuit 240, as discussed below, relay circuit 232 connects and disconnects hybrid circuit 231 and auxiliary telephone 4 with telephone network line 3a and reserves and releases the incoming call.

According to an important aspect of the present invention, an intercom key 253 is also provided on base unit 2A, and is operated in conjunction with intercom key 153 on handset unit 1A to establish the telephone, intercom, and hybrid modes. Auxiliary telephone 4 is connectable by relay circuit 232 to telephone network line 3a to constitute the base loudspeaker/microphone or electro-audio transducer in the intercom telephone system associated with base unit 2A.

When an outgoing call is to be made, the call can be placed either from auxiliary telephone 4 or from handset unit 1A remote from base unit 2A. In these cases, the operation of the cordless telephone is controlled by CPU 241 or by CPUs 141,241, respectively, under the control of control programs stored in ROMs 142 and 242. The description below is given for the second case, that is, the case in which a call is placed from handset unit 1A by way of example. Initially, it is understood that handset unit 1A and base unit 2A have been set to the same channel A or B by appropriate operation of channel selecting key 154.

To make an outgoing call, talk button 152 is placed in its TALK position so that contact 152a contacts fixed contact T. An indication thereof is sent to CPU 141, and control signal TX is generated to enable frequency modulating circuit 113 to transmit a signal, which at this initial state is an unmodulated carrier signal. CPU 141 then derives an identifying code $ID_1$ from RAM 143 which had been previously generated and stored during an operation which will be described in detail below. Identifying code $ID_1$ is supplied to MSK modulating circuit 161, which converts it to MSK signal Sm and supplies it to frequency modulating circuit 113. Since frequency modulating circuit 113 is enabled to transmit signals, identifying code $ID_1$ is transmitted to base unit 2A in FM signal Su. In base unit 2A, reception detecting circuit 262 generates detection signal NSQ in response to the presence of signal Su, and thereupon control circuit 240 enters a check mode to check for identity between the received and stored identification codes. Signal Sm is derived from signal Su in FM demodulator 226 and identifying code $ID_1$ in signal Sm is derived in MSK demodulator 263 and passed to CPU 241. CPU 241 then reads an identifying code $ID_2$ previously stored in RAM 243 and determines whether or not the two identifying codes $ID_1$ and $ID_2$ are identical. If they are not identical, which usually would mean that the telephone call is being made by a handset of a different telephone set, signal TX is adjusted to disable frequency modulating circuit 213 so that further signal transmission is cut off and the cordless telephone remains in the standby mode. On the other hand, if identification codes $ID_1$ and $ID_2$ are identical, frequency modulating circuit 213 remains enabled to transmit signal Sd and to establish the communication channel. In such case, control circuit 240 stops producing muting signal MUTE, so that conversation may take place. Furthermore, since signal Sd is transmitted back to handset unit 1A after identity of identifying codes had been detected in base unit 2A, signal NSQ in handset unit 1A is supplied to control circuit 140, which produces signal TX so as to enable FM modulator 113 and further stops producing muting signal MUTE to release audio frequency amplifier 127. Thus handset unit 1A is also enabled.

At this time, a dial tone is generated in handset unit 1A, and, upon operation of ten-key panel 151, dial signal DS corresponding to the telephone number being dialed is generated in CPU 141 and supplied to MSK modulating circuit 161 for conversion to MSK signal Sm and subsequent transmission to base unit 2A.

Then in base unit 2A dial signal DS is derived in MSK demodulating circuit 263. In response thereto, control circuit 240 causes tone generating circuit 264 to generate tone encode signal TE, which is transmitted through audio frequency amplifier 227, hybrid circuit 231 and relay 232 to telephone network line 3a. The subsequent operation of the cordless telephone in transmitting and receiving the telephone message signals is as described above and the description will not be repeated.

The operation of the cordless telephone when an incoming call is received will now be described. It is assumed that movable contact 152a of talk switch 152 is at contact S, so that cordless telephone 10 is in the standby mode ready to receive a call. When the incoming message signal on telephone network line 3a is received by base unit 2A, bell sound signal BL is derived in bell sound detector 265 and supplied to CPU 241 (FIG. 4). Signal TX is generated to enable frequency modulating circuit 213. Identifying code $ID_2$ read from RAM 243 is converted to signal Sm and supplied to audio frequency amplifier 212, so that identifying code $ID_2$ is transmitted via signal Sd to handset unit 1A.

In handset unit 1A (FIG. 3), signal Sd is received and signal NSQ is derived to put control circuit 140 in the check mode. Identifying code $ID_2$ is derived in MSK demodulator 163 and CPU 141 checks for the identity between received identifying code $ID_2$ and stored identifying code $ID_1$ from RAM 143. If they are not identical, control signal TX disables frequency modulating circuit 113 and the telephone remains in the standby mode. If the two identifying codes are identical, frequency modulating circuit 113 remains enabled, and signal Su is transmitted to base unit 2A. Signal NSQ is derived therein, so that base unit 2A remains enabled and the communication channel is established. Bell tone generator 164 forms a bell signal, which is supplied through amplifier 127 to loudspeaker 128 to create the conventional ringing sound. Thereafter, if handset unit 1A is picked up, and talk button 152 is placed in its TALK position, loudspeaker 128 stops ringing, amplifiers 127 and 227 are released from muting and handset unit 1A receives the call.

The incoming call is announced at handset unit 1A by the ringing sound from loudspeaker 128. It may also be announced at base unit 2A by buzzer 266, provided switch 256 is in its ON position. Switch 256 may be left in its OFF position if only the handset operator wants to receive the call. When buzzer 266 buzzes, it may be turned off by switch 256 and the call received by lifting receiver 4a from its cradle.

The cordless telephone according to the present invention may be changed-over to any one of a plurality of modes. In a telephone mode, hold relay 232 releases the incoming telephone call and either the loudspeaker/microphone of base unit 2A, that is auxiliary telephone 4, or the electro-audio transducer of handset unit 1A, which is constituted by microphone 111 and loudspeaker 128, is placed in communication with telephone network line 3a. The connection between auxiliary telephone 4 and telephone network line 3a is accomplished directly through relay circuit 232. In such case, auxiliary telephone 4 is in telephonic communication with telephone network line 3a. The connection between the electro-audio transducer of handset unit 1A and the telephone network line 3a is accomplished through transmission system 110 and receiving system 120 of handset unit 1A, transmission system 210 and receiving system 220 of base unit 2A and connecting circuit 230 including hybrid circuit 231 and relay circuit 232. In such case, handset unit 1A is in communication with base unit 2A, in that signals are transmitted therebetween over the radio waves, but with respect to telephonic communication, the handset electro-audio transducer 111,128 may be said to be in communication with the telephone network line 3a.

The cordless telephone may also be operated in an intercom mode, wherein the handset electro-audio transducer is in communication with auxiliary telephone 4 (the base electro-audio transducer) through connecting circuit 230. In the intercom mode, the hold relay within relay circuit 232 reserves the incoming telephone call appearing on telephone network line 3a. Thus, the operators at handset unit 1A and base unit 2A communicate with each other but not with the third party placing the incoming telephone call, who has been thus put on hold.

The cordless telephone may be also be put in a hybrid mode, wherein handset loudspeaker/microphone or electro-audio transducer, auxiliary telephone 4 and telephone network line 3a are all in communication with each other. In this mode, the hold relay in relay circuit 232 releases the incoming telephone call, while connecting circuit 230 maintains the connection between auxiliary telephone 4 and the handset electro-audio transducer. This third, hybrid mode represents another advantageous feature of the cordless telephone according to the present invention in permitting three way conversation, if desired.

Both handset unit 1A and base unit 2A include actuable enabling means for enabling communication from the respective electro-audio transducer. In handset unit 1A, talk button 152 enables communication from handset electro-audio transducer 111,118 when it is moved to its TALK position to produce an enable signal to place handset unit 1A in the talk mode. Conversely, when talk button 152 is deactuated, i.e. placed in either its STANDBY position or its OFF position, it produces a disable signal at terminal S or T, which in turn is conveyed to control circuit 140.

As described above, the cordless telephone may be operated in a selected one of the telephone, intercom and hybrid modes, permitting much greater flexibility and convenience in communication. Furthermore, as will now be discussed, this greater flexibility and communication is provided by the addition of only one extra intercom key 154 on handset unit 1A and one extra intercom key 253 on base unit 2A. The establishment of the various modes is achieved by a singularly simple process, employing the use of only the intercom keys 154 and 253, and the preexisting enabling means of handset unit 1A and base unit 2A, that is, talk button 152 and the switch associated with the cradle for receiver 4a. The reduction in the number of extra switches to one on each of the handset and base units results in a reduced manufacturing cost, significantly reduced likelihood of misactuation, and an easy to use operation.

When receiver 4a is lifted from its cradle, communication is enabled. When receiver 4a is returned to its cradle, i.e. the associated switche or enabling means is deactuated, communication is disabled. Conventionally, this is accomplished by a relay circuit within auxiliary telephone 4, which itself may be regarded as the transmitter of a disable signal when receiver 4a is hung up and an enable signal when receiver 4a is lifted.

Figure 5:
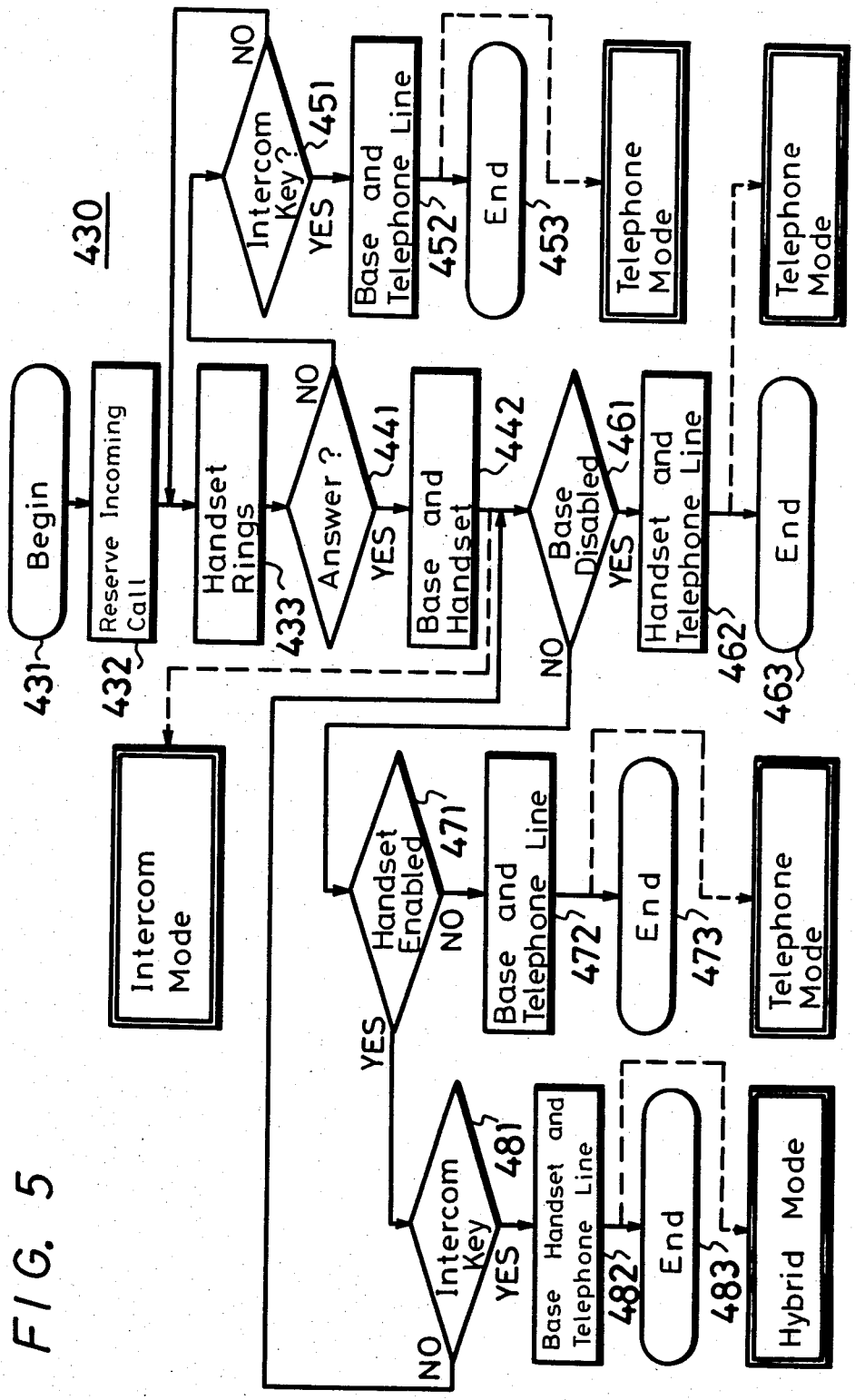
FIG. 5 is a flowchart of a control program of the base unit of FIG. 4 when operative for transferring an incoming telephone call from the base unit to the handset unit.
Figure 6:
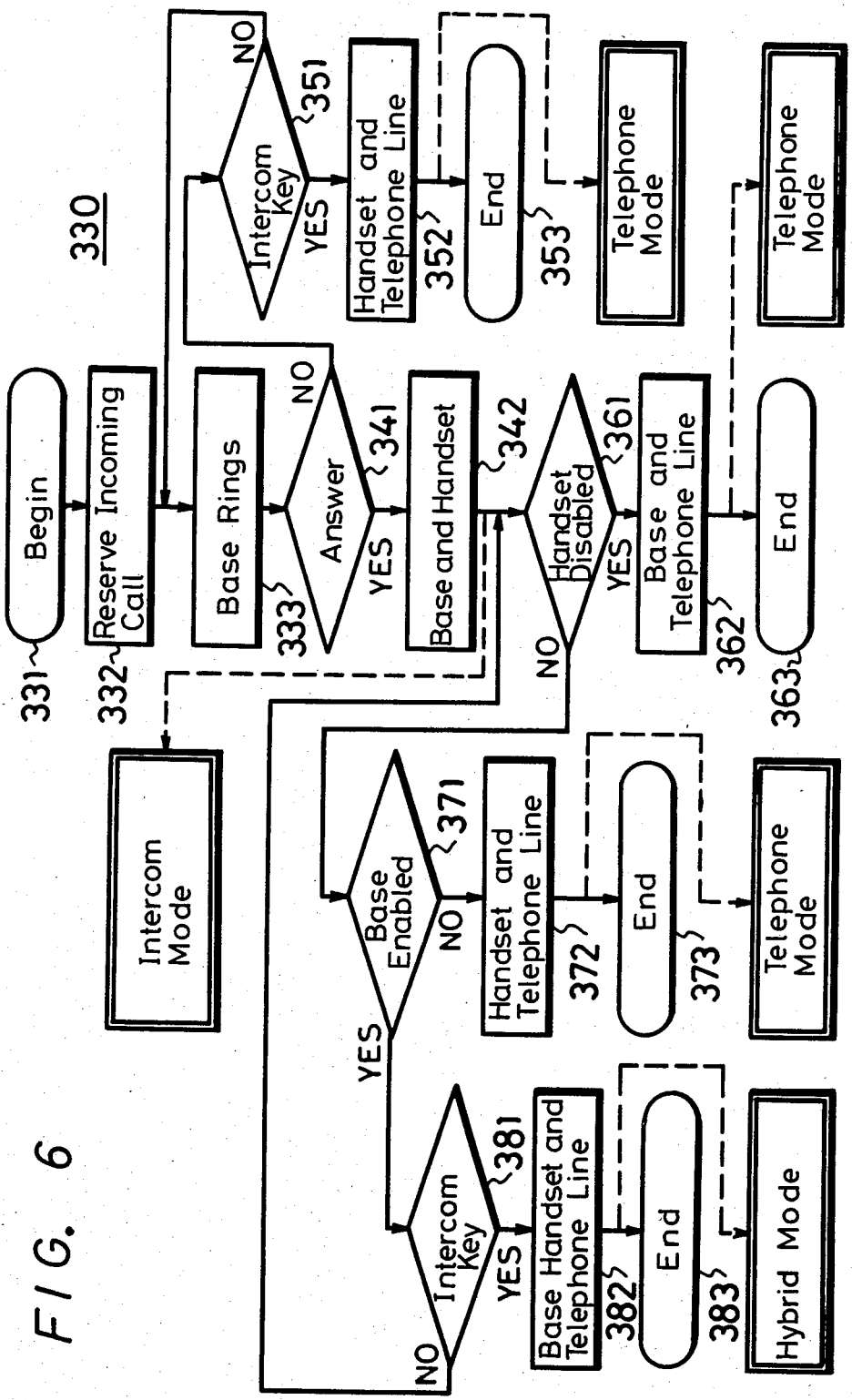
FIG. 6 is flowchart of a control program of the handset unit of FIG. 3 when operative for transferring an incoming telephone call from the handset unit to the base unit.

The operation of the cordless telephone in the telephone, intercom, and hybrid modes to transfer the incoming telephone call under the control of control circuits 140 and 240 will now be explained with reference to FIGS. 5 and 6. FIG. 5 is a flowchart of a control program executed by control circuit 240 of base unit 2A for transferring the call from base unit 2A to handset unit 1A, while FIG. 6 is a flowchart of a control program executed by control circuit 140 of handset unit 1A for transferring the call from handset unit 1A to base unit 2A. In both FIGS. 5 and 6, as in FIG. 2, the physical actuations of the respective switches are indicated in the single bordered boxes, while the resulting conditions are illustrated in the double bordered boxes.

Referring first to FIG. 5, let it be assumed that a telephone conversation is in progress with auxiliary telephone 4 in communication with telephone network line 3a. Relay circuit 232 is then not reserving the telephone call, but has released it. At the same time, let be assumed that talk button 152 is in the STANDBY position so that handset unit 1A is in the standby mode. This common situation occurs, for example, when an incoming call first appears on telephone network line 3a, buzzer 266 announces the call, and the base operator picks up receiver 4a to answer the call. Auxiliary telephone 4 is enabled because receiver 4a has been picked up.

To transfer the telephone call from auxiliary telephone 4 to handset unit 1A, the base operator first depresses intercom key 253. This sends an intercom mode signal to control circuit 240, so that CPU 241 loads control program 430 from ROM 243 and begins to execute it at step 431. In step 432, CPU 241 sends a signal to relay circuit 232 to cause the hold relay therein to reserve the telephone call. Then, in step 433, the control signal generated in MSK signal Sm is transmitted from base unit 2A to handset 1A so as to cause a bell sound to emanate from loudspeaker 128, i.e. handset unit 1A begins to ring.

Meanwhile, in base unit 2A, CPU 241 proceeds to step 441, wherein it determines whether or not handset unit 1A has answered. Specifically, in handset unit 1A, if talk button 152 is moved to its TALK position, an enable signal is thereby supplied to control circuit 140 through fixed contact T, and consequently identifying code ID is transmitted from handset unit 1A to base unit 2A, wherein it is checked for identity with the identifying code ID stored therein. If identity is found, this is interpreted by CPU 241 as handset unit 1A answering. On the other hand, if the proper identifying code ID is not received, either because talk button 152 was not moved to its TALK position, or because a different identifying code was received, i.e. an identifying code from another telephone, this is interpreted CPU 241 as handset unit 1A not answering.

If handset unit 1A does not answer, CPU 241 proceeds to step 451, wherein it checks whether or not intercom key 253 is again actuated after step 432. If not, CPU 241 returns to step 433. Accordingly, until either handset unit 1A answers or intercom key 253 is again actuated, CPU 241 loops through steps 433, 441 and 451. Under these circumstances, loudspeaker 128 keeps ringing to summon the operator at handset unit 1A.

If the handset operator does answer before the base operator depresses intercom key 253 the second time, CPU 241 proceeds to step 442, wherein it causes relay circuit 232 to connect auxiliary telephone 4 to hybrid circuit 231. The intercome mode of the cordless telephone is thus established with communication being possible between auxiliary telephone 4 and the handset loudspeaker/microphone 111,128. At this point, the operators at base unit 2A and handset unit 1A will be talking to each other, with the caller of the incoming telephone call being on hold.

Following step 442, CPU 241 proceeds to step 461 wherein it checks to see if receiver 4a has been hung up. This would of course disable auxiliary telephone 4 from communication. Disabling auxiliary telephone 4 at this point would result in the establishment of the telephone mode with the handset loudspeaker/microphone 111,128 or electro-audio transducer in communication with telephone network line 3a. However, while the two operators are talking, receiver 4a is not hung up and CPU 241 proceeds to step 471, wherein it checks to see whether handset unit 1A is still transmitting signal Su. Cessation of signal Su from handset unit 1A at this point, which would occur if talk button 152 were moved to its OFF or STANDBY position, would result in establishing the telephone mode with auxiliary telephone 4 in communication with telephone network line 3a. Again, while the operators are talking, Su continues to be transmitted, so that CPU 241 proceeds to step 481, wherein it once again checks whether or not intercom key 253 has been depressed. Depressing intercom key 253 at this point would establish the hybrid mode of the cordless telephone, as will be discussed later. However, it is assumed at present that intercom key 253 is not depressed, and normal intercom mode telephone conversation is proceeding, so that CPU 241 returns to step 461. During the entire period of intercom conversation, CPU 241 will repetitively loop through steps 461, 471 and 481 until one of the three conditions happens.

Now let it be assumed that, while in this intercom mode, the base operator hangs up receiver 4a. This produces a disable signal from auxiliary telephone 4 which is detected in control circuit 240 and CPU 241 proceeds to step 462, wherein it causes relay circuit 232 to release the incoming telephone call and hybrid circuit 231 is connected through relay circuit 232 to telephone network line 3a. Thus, at step 462, the handset loudspeaker/microphone or electro-audio transducer 111,128 is placed in communication with telephone network line 3a, or, in other words, the telephone call appearing on telephone network line 3a has been transferred from base unit 2A to handset unit 1A. Control program 430 ends in step 463.

The cordless telephone according to the present invention thus provides a simple and convenient method for transferring the incoming telephone call from base unit 2A to handset unit 1A. As far as the base operator is concerned, when auxiliary telephone 4 rings, he answers the phone by picking up receiver 4a. If he wishes to transfer the telephone call, all he does is depress intercom key 253. This automatically puts the caller on hold and causes handset 1A to ring. When the handset operator answers, the base operator transfers the call just by hanging up receiver 4a. This is clearly a vast improvement over the procedure in the prior art cordless telephones, requiring the actuation of at least three switches in a prescribed order to properly transfer the call.

Now suppose that the handset operator does not answer. After waiting as long as he wishes, the base operator depresses the intercom key 253 again. As shown in FIG. 5, CPU 241 proceeds from step 451 to step 452 wherein it causes relay circuit 232 to release the incoming telephone call and to connect auxiliary telephone 4 with telephone network line 3a. The result is that the base operator is once again in communication with the incoming caller. Control program 430 then ends in step 453.

Thus, not only is the procedure for transferring the telephone call to handset unit 1A simplicity itself, but if the handset operator does not answer, the base operator may once again talk to the caller just by depressing intercom key 253.

Now assume that the intercom mode is established and the base operator is talking to the handset operator, while the incoming call is on hold, i.e. CPU 241 is looping through steps 461,471 and 481, and further assume now that the handset operator does not wish to accept the call, for whatever reason, and he moves talk button 152 to the STANDBY or OFF position. This causes the cessation of signal Su from handset unit 1, which is detected in step 471, and CPU 241 proceeds to step 472, wherein it causes relay circuit 232 to connect auxiliary telephone 4 to telephone network line 3a and to release the incoming telephone call. The base operator has now been automatically placed in communication with the incoming telephone call and may now make his apologies or excuses. CPU 241 then ends control program 430 at step 473.

The final possibility is that with the cordless telephone in the intercom mode the base operator depresses intercom key 253. This causes CPU 241 to establish the hybrid mode. In fact, as discussed below, if intercom key 153 on handset unit 1A is depressed while in the intercom mode, this establishes the hybrid mode. Relay circuit 232 connects auxiliary telephone 4 to telephone network line 3a and also connects handset loudspeaker/microphone to telephone network line 3a through hybrid circuit 231. Relay circuit 232 also releases the incoming telephone call, and so three-way conversation is permitted. Control program 430 then ends in step 482.

This hybrid mode was not available on prior art cordless telephones but is available as an additional feature in the cordless telephone according to the present invention.

Turning now to FIG. 6, there is illustrated therein a control program 330, similar to control program 430, under which CPU 141 is operative to transfer a telephone conversation from handset unit 1A back to base unit 2A. Control program 330 is stored in ROM 142 and is loaded into CPU 141 in response to the intercom mode signal produced on actuation of intercom key 153. Such a transfer from handset unit 1A to base unit 2A was not provided in the prior art cordless telephones and may occur either after the call has been transferred from base unit 2A, or after the call has been directly received by handset unit 1A.

In control program 330, the numbered steps in the 300 series correspond in general to those in FIG. 6, in the 400 series, with certain exceptions. To avoid unnecessary repetition, the sequence will be only briefly run through.

Upon depression of intercom key 153, control program 330 is loaded in step 331 into CPU 141, and in step 332, a signal is transmitted to base unit 2A to cause relay circuit 232 to reserve the incoming telephone call. In step 333, buzzer 266 in base unit 2A rings, and the base operator either answers by picking up receiver 4a, or does not answer. This is checked in step 341, and if base unit 2A answers, auxiliary telephone 4 is connected to the handset loudspeaker/microphone 111,128 in step 342 and the intercom mode is established. While the two operators are talking, CPU 141 repetitively checks in step 361 whether or not talk button 152 has been moved from its TALK position, in step 371 whether base unit 2A is still transmitting signal Sd, i.e. receiver 4a has not been hung up, and in step 381 whether intercom key 153 has been actuated again. If base unit 2A does not answer in step 341 and if intercom key 153 is actuated again in step 351, relay circuit 232 in step 352 reconnects handset loudspeaker/microphone to telephone network line 3a through hybrid circuit 231, disconnects auxiliary telephone 4 and releases the telephone call, so that the handset operator can talk to the incoming caller. The control program 330 then ends in step 353. In the intercom mode, if base unit 2A stops transmitting signal Sd because receiver 4a is hung up, this is detected in step 371 and in step 372 once again relay 232 connects handset loudspeaker/microphone to telephone network line 3a, disconnects auxiliary telephone 4 and releases the telephone call. Control program 330 then ends in step 373. The final alternative is that, while in the intercom mode, if intercom key 153 is depressed again, this is detected in step 381 and in step 382, relay circuit 232 connects handset loudspeaker/microphone, auxiliary telephone 4 and telephone network line 3a all together for three way conversation, and control program 330 ends in step 383.

Thus, to transfer the telephone call from the base unit 2A to handset unit A, all that is required is that intercom key 253 on base unit 2A be depressed, handset unit 1A answer by moving talk button 152 to the TALK position, and receiver 4a be hung up. Conversely, to transfer the telephone call from handset unit 1A to base unit 2A, all that is required is that intercom key 153 be depressed, base unit 2A answer by having receiver 4a lifted from its cradle, and talk button 152 be moved to its OFF or STANDBY position.

It should be noted that there is virtually no risk of the incoming telephone call being cut off. The operator at either unit attempting to transfer the telephone call has only two options: to hang up or to depress his intercom key. If the intercom key is depressed before the other unit answers, the operator is in communication with the incoming telephone call. If the intercom key is depressed after the other unit answers, all three are in communication. If the operator hangs up after the other unit answers, the other unit is in communication with the telephone call. Only if the operator hangs up before the other unit answers will the incoming telephone call be disconnected, and this circumstance is unlikely to be accidental.

Figure 7:
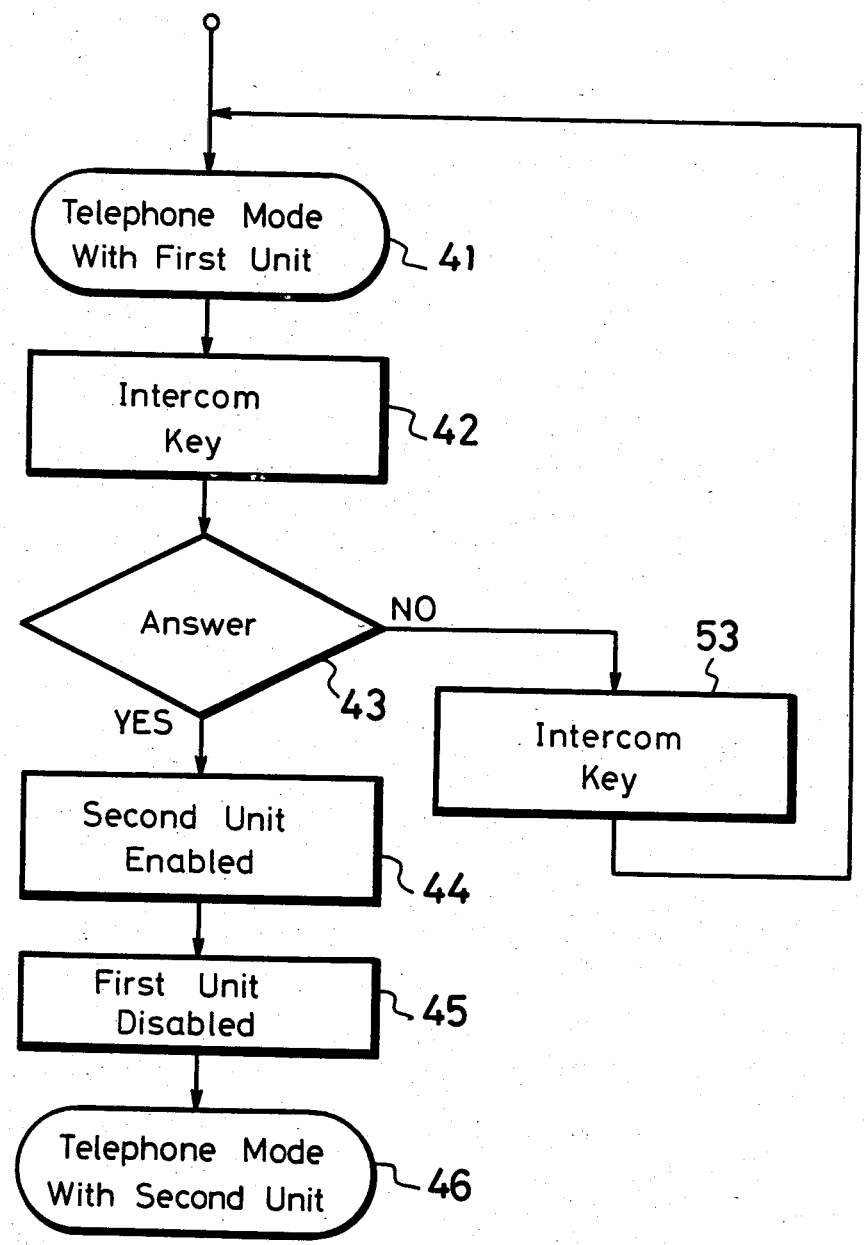
FIG. 7 is a flowchart of a simplified control program operative for transferring an incoming telephone call from one unit to the other unit.

This simplicity is illustrated in FIG. 7, which illustrates, in a straightforward manner, the steps of the control program for the transfer of the telephone call from one unit to the other. Assuming one unit is in communication with the telephone network line in step 41, and in step 42 that the intercom key of the one unit is actuated, step 43 determines whether or not the other unit answers. If it does answer, this is indicated in step 44 and in step 45 the one unit hangs up. In step 46, the other unit is now in communication with the outside line.

Conversely, if in step 43 the other unit does not answer, the intercom key of the one unit may be actuated again in step 53 and operation returns to step 41 wherein the one unit is once again in communication with the telephone network line 3a.

Thus, the transfer operation is both easy and foolproof. It can be repeated as often as desired to transfer the incoming telephone call from one unit to the other and back again. Furthermore, three way conversation is possible between both units and the outside caller.

In the preferred embodiment described above, the base loudspeaker/microphone or electro-audio transducer is constituted by auxiliary telephone 4 and the disabling means is incorporated in the conventional cradle thereof. However, it is possible for base unit 2A to incorporate its own loudspeaker, microphone, ten-key panel, and an enabling switch, thereby eliminating the need for a separate auxiliary telephone.

Furthermore, the operations of circuits numbered 161 to 163 and 261 to 263 may be implemented by software within control circuits 140 and 240, respectively. The circuitry required is very simple and control circuits 140, 240 may be advantageously embodied in microcomputer suitable program in accordance with the flowcharts of FIGS. 5 and 6. Communication with the telephone network line 3a may be achieved by dial pulse communication.

Having specifically described preferred embodiments of the invention, it will be apparent that the invention is not limited to such embodiments, and that many modifications and variations may be effected therein by one skilled in the art without departing from the spirit or scope of the present invention as defined in the appended claims.

We claim:

1. A cordless telephone, comprising:
   a base unit connectable to a telephone network line for receiving and transmitting signals therethrough;
   a handset unit selectively mountable upon and separable from said base unit;
   said base and handset units each including means for the transmission and reception of signals therebetween over electromagnetic waves, said handset unit further including handset loudspeaker/microphone means and said base unit having base loudspeaker/microphone means associated therewith;
   connection means for selectively connecting said base and handset loudspeaker/microphone means with said telephone network line and with each other and including hold means for reserving and releasing a telephone call appearing on said telephone network line;
   first actuable intercom key means at said base unit, and first enabling actuable at said base unit means for enabling communication of said base loudspeaker/microphone means with said handset loudspeaker/microphone means and said telephone network line;
   second actuable intercom key means at said actuable unit and second enabling means actuable at said handset unit for enabling communication of said handset loudspeaker/microphone means with said base loudspeaker/microphone means and said telephone network line and;
   mode control means operative for selectively establishing a plurality of modes of said telephone including a telephone mode, wherein said hold means releases said telephone call and the loudspeaker/microphone means of one of said base and handset units is in communication with said telephone network line, and an intercom mode, wherein said hold means reserves said telephone call and said base and handset loudspeaker/microphone means are in communication with each other;
   said mode control means being responsive to the existing mode of the telephone and to actuation of said intercom key means and enabling means so that, at a time when said telephone is in said telephone mode with one of said base and handset units being in communication with said telephone network line, said mode control means is responsive to actuation of the intercom key means at said one unit to establish said intercom mode, and at a time when said telephone is in said intercom mode, said mode control means is responsive to deactuation of the enabling means at one of said base and handset units to establish said telephone mode with the loudspeaker/microphone means of the other unit in communication with said telephone network line.

2. A cordless telephone according to claim 1; wherein said mode control means is further selectively operative to establish said telephone in a hybrid mode in which said hold means releases said telephone call and both said base and handset loudspeaker/microphone means are in communication with each other and said telephone network line; and wherein, at a time when said telephone is in said intercom mode, said mode control means is responsive to actuation of the intercom key means at either one of said units to establish said hybrid mode.

3. A cordless telephone according to claim 2, wherein said mode control means including base and handset components, said base component is responsive to actuation of said first intercom key means in said telephone mode to cause said base unit to transmit a control signal to said handset component of the mode control means, and said handset component of the mode control means is then responsive to subsequent actuation of said second enabling means to establish said intercom mode.

4. A cordless telephone according to claim 3; wherein said handset component of the mode control means is responsive to actuation of said second intercom key means in said telephone mode to cause said handset unit to transmit a second control signal to said base component of the mode control means, and said base component of the mode control means being responsive to subsequent actuation of said first enabling means to establish said intercom mode.

5. A cordless telephone according to claim 4; wherein said first intercom key means, when actuated, produces a first intercom mode signal which is supplied to said base component of the mode control means, and said second intercom key means, when actuated, produces a second intercom mode signal which is supplied to said handset component of the mode control means; and wherein each of said base and handset components of the mode control means is responsive to reception of the respective intercom mode signal in said telephone mode to transmit said first and second control signals, respectively, to the component of the mode control means of said other unit to establish said intercom mode.

6. A cordless telephone according to claim 5, wherein said base component of the mode control means is responsive to said first intercom mode signal in said intercom mode to cause said base unit to transmit a third control signal to said handset component of the mode control means, and said handset component of the mode control means is responsive to said third control signal to establish said hybrid mode.

7. A cordless telephone according to claim 6; wherein said handset component of the mode control means is responsive to said second intercom mode signal in said intercom mode to cause said handset unit to transmit a fourth control signal to said base mode control means, said base component of the mode control means, and said base component of the mode control means is responsive to said fourth control signal to establish said hybrid mode.

8. A cordless telephone according to claim 1; wherein said mode control means supplies a plurality of control signals to said connection means to control the operation thereof.

9. A cordless telephone according to claim 8, wherein said connection means includes relay means for selectively connecting any two or more of said means for the transmission and reception of signals of said base unit, said base loudspeaker/microphone means and said telephone network line in response to said control signals.

10. A cordless telephone according to claim 1, wherein said base and handset units each further include identity detecting means for detecting when an identifying code signal received at one of said units from the other unit is identical to an identifying code signal stored in said one unit, and means for enabling the base and handset units for the transmission and reception of signals therebetween only when the identity is detected.

11. A cordless telephone according to claim 1, wherein said base loudspeaker/microphone means is included in a standard telephone having a receiver and a cradle, and said first enabling means is actuated in response to lifting of said receiver from said cradle and deactuation is caused by return of said receiver onto said cradle.

12. A cordless telephone according to claim 1, wherein said second enabling means includes switch means actuable for enabling the means for the transmission and reception of signals of said handset unit.

* * * * *